March 24, 1970    E. L. AUSTIN    3,501,862
COVERED FIGURE TOY WITH EYES PROJECTING THROUGH THE COVER
Filed Jan. 4, 1968

INVENTOR
ETHEL L. AUSTIN
BY
ATTORNEY

3,501,862
COVERED FIGURE TOY WITH EYES PROJECTING THROUGH THE COVER
Ethel L. Austin, 1777 Greensburg Road,
North Canton, Ohio 44720
Filed Jan. 4, 1968, Ser. No. 695,719
Int. Cl. A63h 3/02
U.S. Cl. 46—158                    1 Claim

ABSTRACT OF THE DISCLOSURE

Stuffed toy animals are provided with a removable skin. There are button-like eyes sewed on to the stuffed body, and buttonholes in the skin which button over the eyes. These button-like eyes serve no other purpose than ornamentation. There is an opening in the skin through which the stuffed body is inserted, and the opening is closed by snaps or a zipper or other suitable closure. The ears, legs and tail, if any, may be fabricated as a part of the skin or part or all of them may be a part of the stuffed body with the skin fitting over them.

Figure 1:
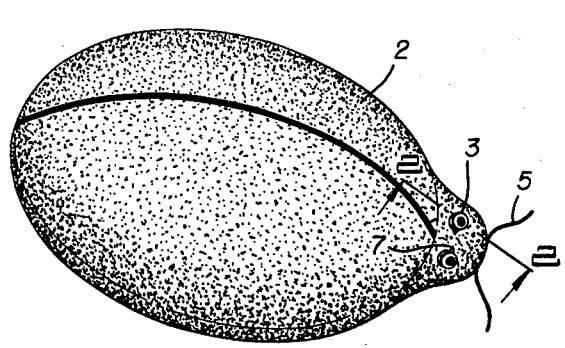

The skin is readily removed for cleaning and can be readily replaced on the stuffed body.

---

The invention relates to a toy animal which is formed of a stuffed body and a removable, washable skin. Decorative buttons or the like which represent the eyes are not on the skin but are attached to the stuffed body and are displayed through buttonholes in the skin. Because the eyes are not on the skin but are attached to the body, the skin, when removed, is easily washed without danger of damaging the eyes.

The term "washable" is used herein in a generic sense to include dry-cleanable or cleansable in any manner whatsoever, except mere spot-cleaning.

Toys with a removable and washable eyeless skin have particular advantages for children with allergies, because they permit the washing of the skin at frequent intervals without any possibility of damaging the eyes.

The toy may be life-like or it may be solely imaginative. The eyes may be made of glass, plastic or metal or even wood, and may be highly ornamental, although for cheaper toys less elaborate eyes may be used. In referring to the eyes as buttons, it is meant that their centers are fastened to a stuffed body by threads or the like which permit the eyes to stand out from the body portion of the toy and permit them to be passed through buttonholes in the skin to be exposed outside of the skin. They are purely decorative and ordinarily, but not necessarily, will include a dark dot against a light background.

Usually there will be two eyes, but there may be a single eye or more than two. The one or more eyes will ordinarily be attached to the stuffed body by a thread, but they may be attached by a staple or other means which permits the edges of the buttonhole in the skin to come substantially into contact with one another under each eye so as to present a pleasant appearance.

The skin may be ordinary cloth or it may be velvet or it may be a fur or imitation fur or the like. It may comprise legs, ears and a tail, or it may include hollow projections to fit over the legs, ears and a tail affixed to the stuffed body.

The animal may be of any attractive design. It may be a beetle-like creature without legs, or it may belong to the bird family and have long spindly legs. It may be a bear, wolf, dog, or even a child; and an attractive toy is a mother kangaroo with a pouch which contains a small kangaroo, preferably of the same construction and coloring as the mother, with eyes sewed to a stuffed body and a furry skin which is buttonholed over the eyes.

The skin is provided with a large enough opening to permit easy removal of the stuffed body when the skin is to be washed, and re-insertion of the stuffed body after washing. Frequent washing is desirable if the owner of the toy has an allergy. The opening may be closed in any suitable manner, such as by snaps, or a zipper or the like, and the opening will usually be located at the back of the toy, but this is not necessarily so, as the presence of a tail or legs or the like may dictate a different location for the opening.

Figure 2:
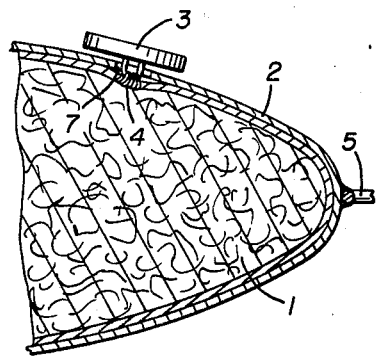
Figure 3:
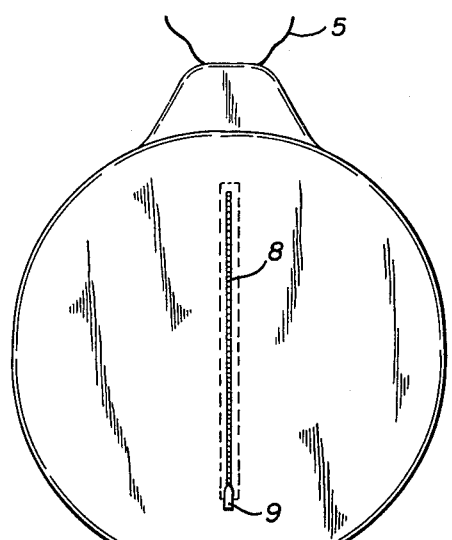
Figure 4:
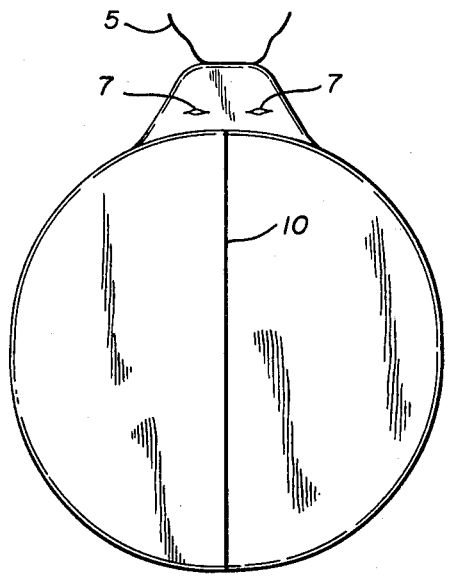
Figure 5:
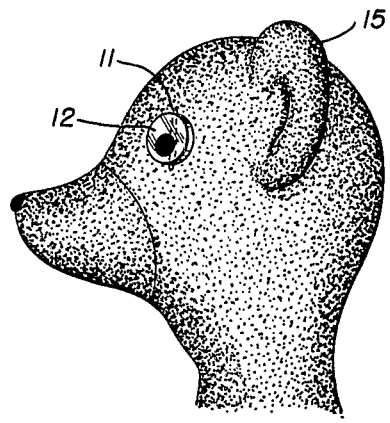

The toy is further described in connection with the accompanying drawings, in which:

FIGURE 1 is a top view of a beetle-like toy;
FIGURE 2 is an enlarged section through the head on the line 2—2 of FIGURE 1;
FIGURES 3 and 4 are views of the bottom and top, respectively, of the cover alone; and
FIGURE 5 is a view of the head only, of a different type of toy.

The toy of FIGURES 1 to 4 includes the stuffed body 1 and the skin covering 2. Eyes 3 are buttons which are sewed by the threads 4 to the body 1. The feeler 5 is stiff plastic cord or the like. These feelers are fastened to the skin by threads or the like or they may be sewed right into the skin.

Buttonholes 7 in the skin are large enough to accommodate the buttons 3. There is an opening 8 on the bottom of the skin closed by zipper 9. The line 10 across the top of the skin is purely decorative. Other decorative features may be applied as desired.

Any toy gets dirty relatively quickly. The toy of a child who has allergies must be cleaned often. The skins of the toys of this invention are easily removed and quickly replaced after cleaning. The particular advantage of the invention is that the eyes are not attached to the skin. If attached to the skin, they would be apt to be damaged when the skin is cleaned. Furthermore, when fastened to the skin they are not ordinarily held as firmly and permanently to the toy as when they are attached to the stuffed body.

FIGURE 5 is illustrative of a toy of different design, the purpose being to illustrate that the skin of a head of any usual shape may be removable and to illustrate that buttonholes 11 in a skin of different design can be provided around projecting eyes 12. The ears 15 may be stuffed as a part of the skin, or the skin may fit over such ears located on the stuffed body. In a toy such as suggested by FIGURE 5, which has four legs, the opening in the skin will usually be up the back.

It is obvious that the invention is not limited to the toys which are illustrated. It has wide application and is applicable to toys of widely different shapes and characteristics. The eyes may be of any suitable composition and the skin may be of any suitable fabric.

The invention is covered in the claim which follows:

1. A toy animal which includes a stuffed body with a head area having a face with at least one button eye, means securing each said button eye to said face area, and a washable removable skin which fits snugly over the stuffed body and is provided under each eye with a buttonhole for each said button eye of a size allowing passage of said button eye therethrough, said securing means permitting each said button eye to be passed through its buttonhole and be exposed outside of said skin when said skin is snugly fitted on said body, the skin being provided with an opening for insertion and removal of the stuffed body, and closure means for the opening.

References Cited

UNITED STATES PATENTS

| | | | |
|---|---|---|---|
| 1,690,778 | 11/1928 | Ford | 46—158 |
| 2,089,376 | 8/1937 | Jacobson | 46—162 X |
| 2,274,303 | 2/1942 | Ornstein | 46—158 |

F. BARRY SHAY, Primary Examiner